April 10, 1934.  B. E. DYAL  1,953,930
SPRING MANIPULATING TOOL
Filed Sept. 17, 1931

Inventor:
Bonnie E. Dyal
By Harry C. Deuts
Atty.

Patented Apr. 10, 1934

1,953,930

UNITED STATES PATENT OFFICE 1,953,930

SPRING MANIPULATING TOOL

Bonnie E. Dyal, Palestine, Tex., assignor of one-half to George W. White, Dallas, Tex.

Application September 17, 1931, Serial No. 563,240

2 Claims. (Cl. 29—87.1)

This invention relates to spring manipulating devices and more particularly to tools for assembling the vehicle brake springs, although it may be employed with equal advantage for other purposes.

It contemplates more especially the provision of a novel, dependable and inexpensive means for servicing the springs in connection with vehicle brakes of the drum type.

The servicing of springs employed in vehicle brakes is a very tedious and difficult operation, entailing a great deal of time and expense. This is rendered difficult owing to the inconvenient accessibility of the parts and the inability of utilizing ordinary tools for that purpose. The tensioning of a spring requires appreciable effort and the manipulation thereof is only accomplished with difficulty for brake assembly and dismantling, thereby presenting a problem to every mechanic in servicing vehicle brakes and the constituent parts thereof.

One object of the present invention is to simplify the construction and improve the operation of devices of the character mentioned.

Another object is to provide a simple, dependable and inexpensive tool for servicing brake springs without entailing much labor and time.

Still another object is to provide a novel tool for effectively manipulating vehicle brake springs so as to afford their ready assembly and dismantling.

A further object is to provide a tool of the plier type having confronting jaws of novel type for effective manipulation of springs in connection with a brake drum assembly.

A still further object is to provide a tool having a brake band engaging jaw for operation with a novelly constructed furcated spring engaging extremity capable of manipulating springs with utmost dependability and ease of operation.

Still a further object is to provide a simple and novel tool for rendering brake springs readily accessible and capable of effective manipulation for ready association and disassociation with a vehicle brake assembly.

Other objects and advantages will appear from the following description of an illustrated embodiment of the present invention.

Figure 1:
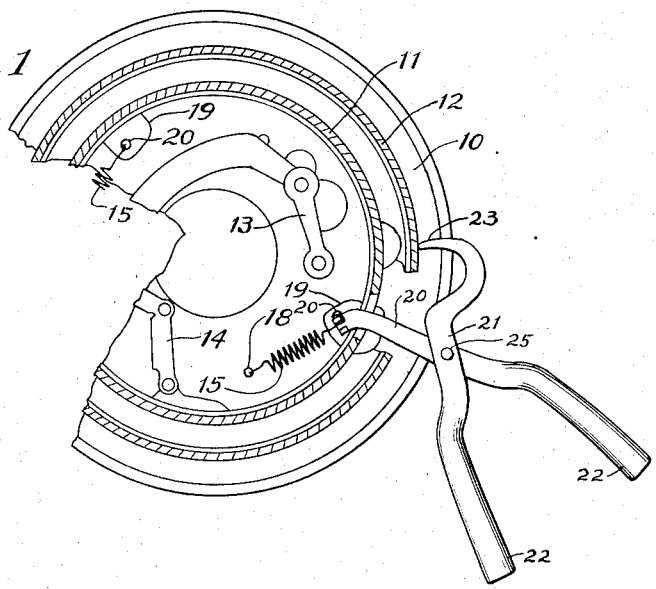
Figure 1 is a fragmentary front view of a brake assembly showing the application of the tool embodying features of the present invention.
Figure 2:
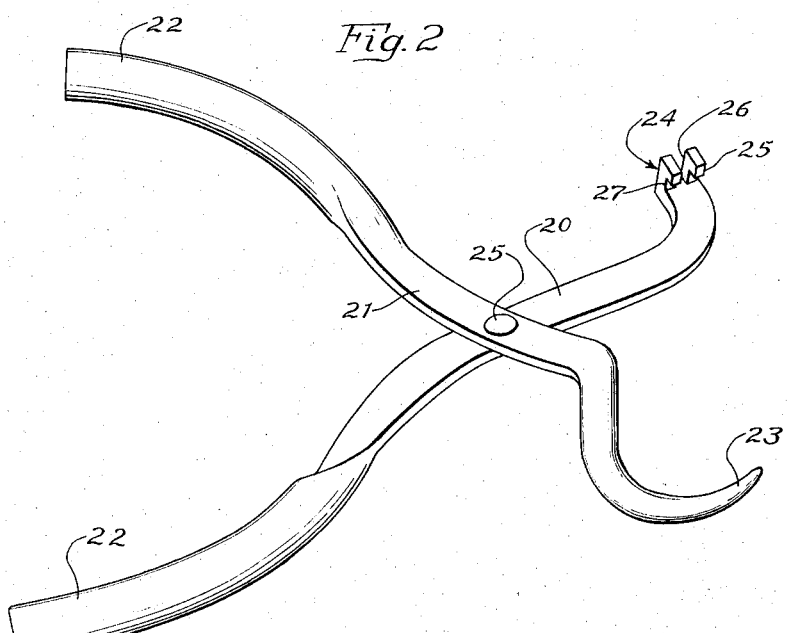
Figure 2 is a perspective view of a tool embodying features of the present invention.
Figure 3:
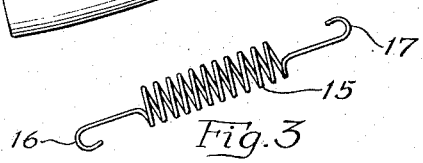
Figure 3 is a view of a spring of the type normally used in connection with vehicle brakes.

The structure selected for illustration is shown in association with a vehicle brake 10 having the customary brake bands 11 and 12 mounted thereon for the purpose of controlling the operation and movement of a vehicle. The control instrumentalities of the vehicle are operatively connected to levers 13 and 14 which render the interior brake band 11 expansive in order to accomplish the braking action. The brake band 11 is normally maintained in its contracted position without any braking effect by means of any suitable number of springs 15.

The springs 15 are preferably, though not essentially of spiral construction to comprise an elongated series of convolutions terminating in looped extremities 16 and 17. The looped extremities 16 and 17 are, in this instance, of the open type so that engagement thereof may be readily effected with an aperture 18 provided in the brake housing 10. The other extremity 17 of the spring 15 must be attached to some portion of the brake band 11 so as to impart an urge thereon. In the present embodiment the brake band 11 is provided with a lug 19 integrally or otherwise associated therewith for fixed joinder in any suitable position.

As shown the plate 19 is provided with an aperture 20 therein for engaging lodgment of spring extremity 17 thereby tensioning the brake band 11 to maintain the released position thereof. The problem of servicing the spring 15 either to effect the replacement thereof or its assembly in operative position, presents a problem that is quite difficult to the mechanic without entailing considerable labor and time. The association and disassociation of the spring 15 with the vehicle brake assembly 10 is usually accomplished with much difficulty, and in consequence thereof a tool has been provided that is particularly adaptable and accessible for convenient and effective manipulation of the brake springs 15.

The tool comprises, in this instance, a pair of lever members 20 and 21 which terminate in handle portions 22 for grasp by the attendant to effect the separation or approach of the jaw extremities 23 and 24 thereof. To this end the lever members 20 and 21 are pivotally connected by means of pin 25 and the jaws 23 and 24 are capable of manipulation with one hand of the operator or attendant. In order to maintain a fixed position from which the spring 15 is tensioned, the jaw 23 is substantially pointed so that exterior brake band 12 may be effectively grasped. This precludes any possible slip, and the other jaw 24 is available for manipulation of the spring 15.

The jaw 24 preferably extends laterally from the surface of the lever 20 in the direction of the complemental lever 21 to present an upstanding shoulder 25 extending in the direction of the jaw 23. The jaw 24 including the shouldered portion thereof is furcated to present a slot 26 provided to accommodate the extremity 17 of the spring 15 for projection therethrough. The looped spring extremity 17 is lodged in the notch 27 defined by the shouldered jaw portions 25 on each of the furcations in confronting relation with the surface of the lever member 20, thereby precluding the accidental removal of the looped extremity constituting a part of a right or left handed spring therefrom.

With the jaw 23 in brake band engagement and the jaw 24 connected to the spring extremity 17, it is readily possible for the attendant to tension the spring 15 by clutching the handle members 22, and the looped extension 17 may then be lodged for engagement of the aperture 20 provided in the lug 19 of the brake band 11. It is thus possible to conveniently assemble the spring 15 to its operative position, and the removal thereof is equally simple by grasping the spring extremity 17 and then effecting slight tensioning to afford convenient removal from the lug aperture 20. This enables the manipulation of the spring 15 or any number thereof that may be provided in a vehicle assembly 10, for the manipulation of the tool in this manner is effective, convenient and requires very little effort.

Various changes may be made in the embodiment of the invention herein specifically described without departing from or sacrificing any of the advantages of the invention as defined in the appended claims.

I claim:

1. A brake spring tool comprising a pair of lever members, a sharply pointed brake drum engaging jaw on one of said members, a furcated spring engaging and tensioning jaw on the other of said members, each of said jaw furcations having a shoulder thereon to engage the extremity of a left or right handed spring, and a pivot connecting said lever members to enable the manipulation of a spring for assembly and dismantling in association with a brake drum.

2. A brake spring tool comprising a pair of lever members, a sharply pointed brake drum engaging jaw on one of said members, a furcated spring engaging and tensioning jaw on the other of said members, a shoulder on each of the furcations of said jaw to retain a spring extremity against release by engagement of one or the other of said shoulders, and a pivot connecting said lever members to enable the manipulation of a spring for assembly and dismantling in association with a brake drum.

BONNIE E. DYAL.